United States Patent [19]

Ide et al.

[11] Patent Number: 6,133,332
[45] Date of Patent: Oct. 17, 2000

[54] PROCESS FOR PRODUCING PHENOLIC RESIN FOAMS

[75] Inventors: Satoshi Ide; Takashi Shibanuma, both of Settsu, Japan

[73] Assignee: Daikin Industries, Ltd., Osaka, Japan

[21] Appl. No.: 09/341,300

[22] PCT Filed: Dec. 22, 1997

[86] PCT No.: PCT/JP97/04759

§ 371 Date: Jul. 8, 1999

§ 102(e) Date: Jul. 8, 1999

[87] PCT Pub. No.: WO98/30623

PCT Pub. Date: Jul. 16, 1998

[30] Foreign Application Priority Data

Jan. 8, 1997 [JP] Japan .................................. 9-001191

[51] Int. Cl.$^7$ ........................................................ C08J 9/14
[52] U.S. Cl. ............................ 521/131; 521/98; 521/181
[58] Field of Search ............................. 521/98, 131, 181

[56] References Cited

U.S. PATENT DOCUMENTS 5,250,208  10/1993  Merchant et al. ........................ 62/114
5,696,306  12/1997  Ide et al. ................................ 510/109

FOREIGN PATENT DOCUMENTS 5-230265  9/1993  Japan .
5-239251  9/1993  Japan .
6-65413   3/1994  Japan .

*Primary Examiner*—Morton Foelak
*Attorney, Agent, or Firm*—Larson & Taylor PLC

[57] ABSTRACT

This invention discloses a process for producing a phenolic resin foam, the process comprising the step of reacting a liquid phenolic resin with an acidic curing agent in the presence of a low-boiling organic compound-based blowing agent, the process being characterized in that the low-boiling organic compound-based blowing agent is a mixed blowing agent comprising 1,1,1,3,3-pentafluoropropane and at least one of a hydrocarbon having a boiling point in the range of 40 to 80° C. and a hydrogen-containing fluorohydrocarbon having a boiling point in the range of 40 to 80° C., the proportion of the mixed blowing agent being 5 to 20% by weight based on the liquid phenolic resin.

The process is capable of giving high heat insulation property, flame retardancy and in situ applicability to the phenolic resin foam.

3 Claims, No Drawings

PROCESS FOR PRODUCING PHENOLIC RESIN FOAMS

FIELD OF THE INVENTION

The present invention relates to a process for producing a phenolic resin foam which is lightweight and excellent in heat insulation property and in flame retardancy, and more particularly to an improved process for producing a phenolic resin foam having uniform bubbles, the process being characterized by the use of a specific low-boiling organic compound-based blowing agent.

BACKGROUND ART

Rigid urethane foams can be produced in situ using spray means or the like and have been used in various fields including building field as an heat-insulating material for preventing dew condensation or the like. However, such urethane foams have a drawback of low flame retardancy. In this situation, phenolic resin foams have come into use, the foams being superior not only in flame retardancy but in heat insulation property, sound insulation property and the like. However, the phenolic resin is difficult to spray in an evenly dispersed state due to its high viscosity, and at a low temperature, the foaming reaction is hindered, giving a foam which is brittle at the surface and low in adhesion. In short, difficulties are encountered in in situ production.

Generally a phenolic resin foam is prepared as follows. A resol phenolic resin serving as a raw material is mixed with a blowing agent, a foam stabilizer, a curing agent and other additives to give a uniform composition. Then the composition is poured into a mold and expanded at an elevated temperature.

In said production of phenolic resin foams, chlorofluorocarbons are used as a low-boiling organic compound-based blowing agent, said chlorofluorocarbons having a low heat conductivity and showing high heat insulation property when enclosed with closed cells. For example, trichlorofluoromethane (CFC-11) and trichlorotrifluoroethane (CFC-113) have been chiefly used.

In recent years, however, it has been suggested that some chlorofluorocarbons, when released into the atmosphere, would deplete the stratospheric ozone layer, and would cause global warming due to greenhouse effect, thereby inflicting a serious adverse influence on the ecosystem including humans. An international agreement calls for a restriction of use of chlorofluorocarbons involving a high ozone-depleting risk. Said CFC-11 and CFC-113 are among the chlorofluorocarbons to be controlled for restriction. From this viewpoint as well, there is a need for development of novel blowing agents which are free from the ozone-depleting and global warming problems or substantially without such risks.

Of late, it was proposed to use 1,1-dichloro-1-fluoroethane and 1,1-dichloro-2,2,2-trifluoroethane as chlorofluorocarbons which would exert little influence on the ozone layer, and they have currently come into use. Yet these chlorofluorocarbons threaten us with ozone depletion none the less because they contain chlorine in the molecule. Japanese Unexamined Patent Publications Nos. Hei 2-29440 and Hei 2-235982 proposed to use chlorine-free fluorohydrocarbons free from ozone-depleting risks. Japanese Unexamined Patent Publication No. Hei 5-239251 proposed the use of 1,1,1,3,3-pentafluoropropane as a blowing agent for the production of plastic foams.

1,1,1,3,3-pentafluoropropane (HFC-245fa) which is a non-inflammable compound with a boiling point of 15° C. and a hydrogen-containing fluorohydrocarbon is considered to entail little or no ozone-depleting or global warming risks.

Currently attention is directed to 1,1,1,3,3-pentafluoropropane as a promising candidate substitute for CFC-11 and CFC-113 because of its boiling point close to theirs and its non-inflammability.

DISCLOSURE OF THE INVENTION

It is a principal object of the present invention to provide a process for producing a phenolic resin foam using a blowing agent which is free of ozone-depleting risks and is unlikely to adversely affect global warming, the blowing agent being flame retardant, having a suitable boiling point, and excelling in compatibility with the raw material for a foam, the process being capable of imparting high heat insulation property, flame retardancy and in situ applicability to the phenolic resin foam.

The present inventors conducted extensive research in view of the foregoing problems of prior art and found that the foregoing object can be achieved by a process for producing a phenolic resin foam, the process comprising the step of reacting a liquid phenolic resin with an acidic curing agent in the presence of a low-boiling organic compound-based blowing agent, the process being characterized in that the low-boiling organic compound-based blowing agent is a mixed blowing agent comprising 1,1,1,3,3-pentafluoropropane and at least one of a hydrocarbon having a boiling point in the range of 40 to 80° C. and a hydrogen-containing fluorohydrocarbon having a boiling point in the range of 40 to 80° C., the proportion of the mixed blowing agent being 5 to 20% by weight based on the liquid phenolic resin.

The hydrocarbon for use in the present invention is at least one member selected from the group consisting of 2,2-dimethylbutane (b.p. 50° C.), 2,3-dimethylbutane (b.p. 58° C.), cyclopentane (b.p. 50° C.), 2-methylpentane (b.p. 62° C.), 3-methylpentane (b.p. 64° C.), and n-hexane (b.p. 69° C.).

Since these hydrocarbons have a lower molecular weight than HFC-245fa, a foam is efficiently formed. The boiling point of the mixed blowing agent can be controlled according to the proportion of the hydrocarbon used so that the degree of foaming is adjustable depending on the atmosphere temperature, thereby facilitating the production of a foam. Further it was found that in view of a slightly low solubility of HFC-245fa in the phenolic resin serving as the raw material, the solubility of the mixed blowing agent in the phenolic resin can be improved by mixing a hydrocarbon of high solubility and the range of usable phenolic resins can be extended.

Another finding was as follows. Because a low-boiling and non-inflammable HFC-245fa is readily vaporizable, the vaporization of hydrocarbons as flammable components is depressed and the composition range of flame retardant mixture is widened.

The hydrogen-containing fluorohydrocarbon to be used is at least one member selected from the group consisting of octafluorobutane, decafluoropentane, octafluorocyclopentane, pentafluorobutane and methoxy-nonafluorobutane.

The octafluorobutane for use herein includes, for example, 1,1,2,2,3,3,4,4-octafluorobutane (b.p. 44° C.); the decafluoropentane for use herein includes, for example, 1,1,1,2,2,3,4,5,5,5-decafluoropentane (b.p. 54° C.); the octafluorocyclopentane for use herein includes, for example, 1,2,3,3,4,4,5,5-octafluoro-cyclopentane (b.p. 79° C.); the pentafluorobutane for use herein includes, for example, 1,1,1,3,3-pentafluorobutane (b.p. 40° C.); and the methoxy-nonafluorobutane for use herein includes, for example, 1-methoxy-nonafluorobutane (b.p. 60° C.). Since these hydrogen-containing fluorohydrocarbons have a higher boiling point than HFC-245fa, the boiling point of the mixed blowing agent can be controlled according to the proportion of the hydrogen-containing fluorohydrocarbon, so that the degree of foaming can be adjusted depending on the atmosphere temperature, thereby facilitating the production of a foam. Moreover, the hydrogen-containing fluorohydrocarbons which are non-inflammable do not impair the flame retardancy of the phenolic resin.

The proportion of HFC-245fa and that of at least one of hydrocarbon and hydrogen-containing fluorohydrocarbon to be used can be optionally selected according to the purpose, composition and the like. The proportions which result in a mixture with a boiling point of about 20 to about 50° C. are more preferred.

The proportion of HFC-245fa to be used can be optionally selected from the range of 5–97% by weight, and the proportion of hydrocarbon(s) to be used from the range of 95–3% by weight, according to the purpose, composition and the like. The proportions which give a mixture a boiling point of about 20 to about 50° C. are more preferred. The proportions of respective hydrocarbons are 3–95% by weight (2,2-dimethylbutane), 3–80% by weight (2,3-dimethylbutane), 3–95% by weight (cyclopentane), 3–70% by weight (2-methylpentane), 3–70% by weight (3-methylpentane) and/or 3–60% by weight (n-hexane). Smaller proportions of hydrocarbons are more preferred because they are flammable.

The proportion of HFC-245fa to be used can be optionally selected from the range of 5–95% by weight, and the proportion of hydrogen-containing fluorohydro-carbon(s) to be used from the range of 95–5% by weight, according to the purpose, composition and the like. The proportions which give a mixture a boiling point of about 20 to about 50° C. are more preferred. The proportions of respective hydrogen-containing fluorohydrocarbons are 5 to 95% by weight (1,1,2,2,3,3,4,4-octafluorobutane), 5 to 95% by weight (1,1,1,2,2,3,4,5,5,5-decafluoropentane), 5 to 70% by weight (1,2,3,3,4,4,5,5-octafluorocyclo-pentane), 5 to 95% by weight (1,1,1,3,3-pentafluoro-butane), and/or 5 to 90% by weight (1-methoxy-nonafluorobutane).

The specific low-boiling organic compound-based blowing agent can be used in the present invention either alone or in combination with other blowing agents or carbonates. Examples of the blowing agents to be used in combination with the low-boiling organic compound-based blowing agent are 1,1-dichloro-1-fluoroethane, 1,1-dichloro-2,2,3,3,3-pentafluoropropane, 1,3-dichloro-1,1,2,2,3,-pentafluoropropane, methylene chloride, 1,1,1,2-tetrafluoroethane and like low-boiling halogenated hydrocarbons, air, nitrogen, carbon dioxide gas and like inert gases. When other blowing agents are used, the proportion of the specific low-boiling organic compound-based blowing agent is at least 20% by weight, preferably at least 40% by weight, based on the total blowing agents.

A preferred proportion of the specific low-boiling organic compound-based blowing agent is 5 to 20% by weight based on the liquid phenolic resin.

Examples of useful carbonates are potassium carbonate, sodium carbonate and like metal carbonates, ammonium carbonate, and the like. The proportion of the carbonate to be used is usually 0.01 to 5% by weight.

The blowing agent for use herein may contain a decomposition inhibitor, when so required. Preferred examples of the decomposition inhibitor are nitrobenzene, nitromethane and like nitro compounds; α-methylstyrene, p-isopropenyltoluene and like aromatic hydrocarbons; isoprene, 2,3-dimethylbutadiene and like aliphatic unsaturated hydrocarbons; 1,2-butylene oxide, epichlorohydrin and like epoxy compounds; p-t-butylcatechol, 2,6-di-t-butyl-p-cresol and like phenolic compounds, etc. The proportion of these decomposition inhibitors to be used is about 0.05 to about 5% by weight based on the blowing agent of the present invention.

Useful liquid phenolic resins are not limited and conventional liquid phenolic resins can be widely used and include, for example, resol phenolic resins, benzylic ether aqueous phenolic resins and the like.

Resol phenolic resins which can be suitably used include, for example, those prepared by reacting phenol or alkyl phenol or like phenolic compounds with formaldehyde in a molar ratio of 1:1–3 in the presence of a basic catalyst such as NaOH. The viscosity of phenolic resin is usually about 1000 to about 5000 cps (25° C.). The phenolic resin may contain a nonvolatile components in the proportion of 70 to 80% and has a pH of about 7 to about 8.

Useful foam stabilizers are silicone-based surfactants and fluorine-containing surfactants, specifically surfactants based on polysiloxane-polyalkylene-block copolymer, or methyl polysiloxane. The proportion of the foam stabilizer to be used is usually 1 to 10% by weight.

Useful acidic curing agents include those known such as inorganic acids, more specifically hydrochloric acid, sulfuric acid and phosphoric acid, organic acids, more specifically benzenesulfonic acid, phenolsulfonic acid, toluenesulfonic acid, and the like. When a problem is posed by metal corrosion due to the acid remaining in the foam, an organic acid is advantageously used. The proportion of the acidic curing agent is usually 10 to 40% by weight.

Optionally the foamable composition of the present invention may further contain a flame retarder (such as boric acid, ammonium phosphate, urea and the like), a neutralizing agent (such as zinc powder, magnesium carbonate, barium sulfate and the like), and a filler (such as hydrated alumina and the like).

A phenolic resin foam can be produced from the foregoing components in the conventional manner, more specifically, employing a spray-foaming device or the like and using, based on the liquid phenolic resin, 10 to 40% by weight of the acidic curing agent, 1 to 10% by weight of the silicone-based foam stabilizer, 5 to 20% by weight of the mixed blowing agent, and if necessary, other additives, at a temperature of about 20 to about 50° C.

According to the invention, there is provided a process for producing a phenolic resin foam using a blowing agent which is free of ozone-depleting risks and which is unlikely to adversely affect global warming, the blowing agent being flame retardant, having a suitable boiling point, and excelling in compatibility with the raw material for a foam, the process being capable of imparting high heat insulation property, flame retardancy and in situ applicability to the phenolic resin foam.

BEST MODE OF CARRYING OUT THE INVENTION

The present invention is described below in more detail with reference to the following examples.

EXAMPLE 1

Using components based on the following composition, a phenolic resin foam was produced according to the present invention.

| Components | Amount (wt. part) |
|---|---|
| Resol phenolic resin (viscosity 2000 cps) | 100 |
| Silicone foam stabilizer (product of Toray Silicone Co., Ltd. "SH 190") | 4 |
| Blowing agent | |
| 1,1,1,3,3-Pentafluoropropane | 10 |
| Cyclopentane | 2 |
| Aqueous solution of potassium carbonate (50%) | 0.5 |
| Curing agent (Toluenesulfonic acid 65% aqueous solution) | 25 |

The mixture of the foregoing components was spread on a vertical wall at 40° C. using a spray-foaming device. The mixture showed a reactivity in terms of a cream time of 2 seconds and a rise time of 6 seconds, and deposited on the wall without sagging with a high spray dispersibility and a good adhesion to the wall, giving a phenolic resin foam with a density of 30 kg/m$^3$.

EXAMPLE 2

Using components based on the following composition, a phenolic resin foam was produced according to the present invention.

| Components | Amount (wt. part) |
|---|---|
| Resol phenolic resin (viscosity 2000 cps) | 100 |
| Silicone foam stabilizer (product of Toray Silicone Co., Ltd. "SH 190") | 4 |
| Blowing agent | |
| 1,1,1,3,3-Pentafluoropropane | 10 |
| 1,1,1,2,2,3,4,5,5,5-Decafluoropentane | 2 |
| Aqueous solution of potassium carbonate (50%) | 0.5 |
| Curing agent (Toluenesulfonic acid 65% aqueous solution) | 25 |

The mixture of the foregoing components was spread on a vertical wall at 40° C. using a spray-foaming device. The mixture showed a reactivity in terms of a cream time of 2 seconds and a rise time of 7 seconds, and deposited on the wall without sagging with a high spray dispersibility and a good adhesion to the wall, giving a phenolic resin foam with a density of 32 kg/m$^3$.

What is claimed is:

1. A process for producing a phenolic resin foam, the process comprising the step of reacting a liquid phenolic resin with an acidic curing agent in the presence of a low-boiling organic compound-based blowing agent, the process being characterized in that the low-boiling organic compound-based blowing agent is a mixed blowing agent comprising 1,1,1,3,3-pentafluoropropane and at least one of a hydrocarbon having a boiling point in the range of 40 to 80° C. and a hydrogen-containing fluorohydrocarbon having a boiling point in the range of 40 to 80° C., the proportion of the mixed blowing agent being 5 to 20% by weight based on the liquid phenolic resin.

2. The process according to claim 1, wherein the hydrocarbon is at least one member selected from the group consisting of 2,2-dimethylbutane, 2,3-dimethylbutane, cyclopentane, 2-methylpentane, 3-methylpentane and n-hexane, and wherein the proportions of 1,1,1,3,3-pentafluoropropane and hydrocarbon are 97–5% by weight and 3–95% by weight, respectively.

3. The process according to claim 1, wherein the hydrogen-containing fluorohydrocarbon is at least one member selected from the group consisting of octafluorobutane, decafluoropentane, octafluorocyclopentane, pentafluorobutane and methoxy-nonafluorobutane, and wherein the proportions of 1,1,1,3,3-pentafluoropropane and hydrogen-containing fluorohydrocarbon are 95–5% by weight and 5–95% by weight, respectively.

\* \* \* \* \*